(No Model.)
C. W. COLLINS.
HITCHING DEVICE.
No. 515,325.   Patented Feb. 27, 1894.
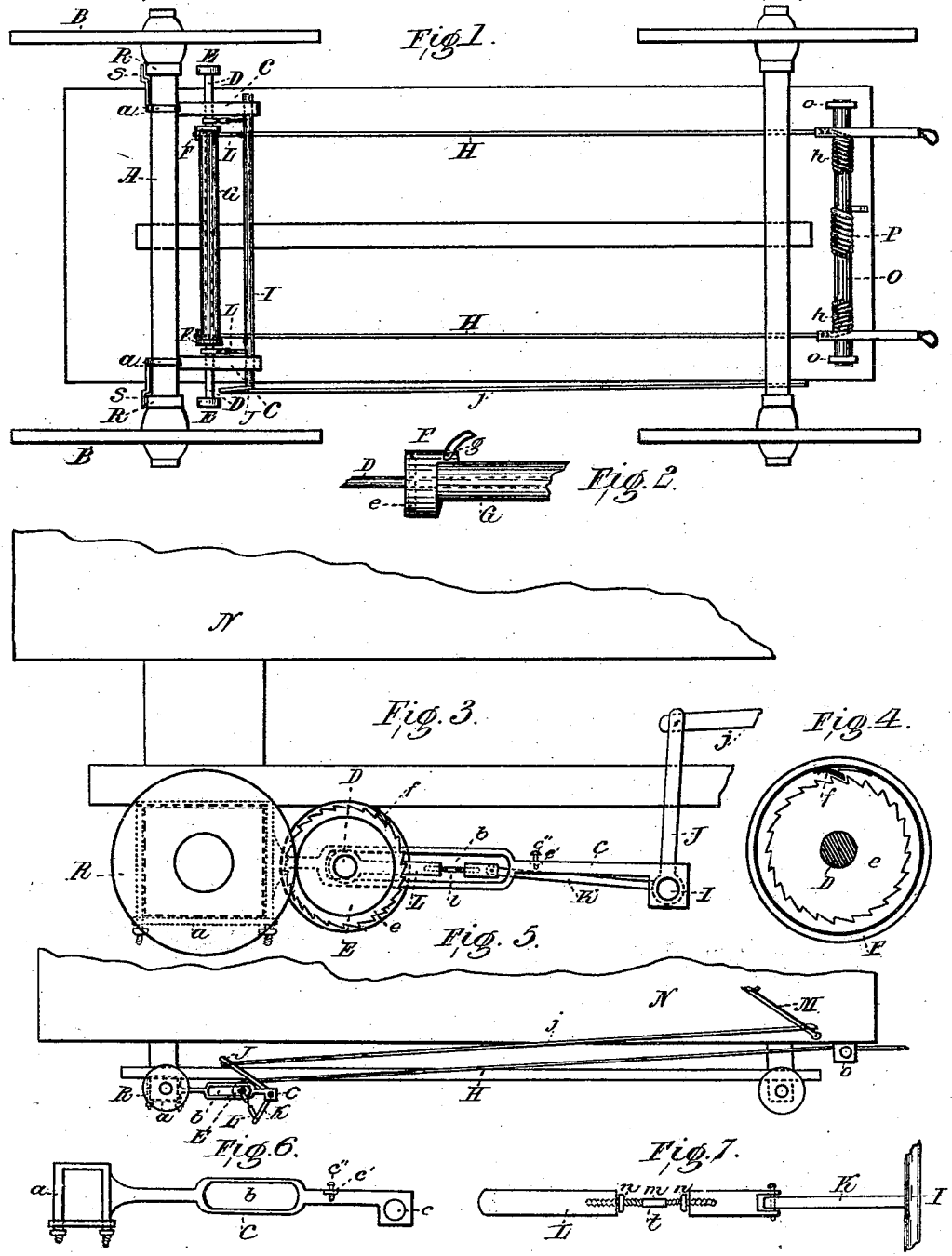
Witnesses.
Gilman Bullard.
George K. Reeder.
Chas. W. Collins, Inventor
per Edward S. Russ
Attorney.

United States Patent Office.

CHARLES W. COLLINS, OF GRANITE, MONTANA.

HITCHING DEVICE.

SPECIFICATION forming part of Letters Patent No. 515,325, dated February 27, 1894.

Application filed May 22, 1893. Serial No. 474,992. (No model.)

*To all whom it may concern:*

Be it known that I, CHARLES W. COLLINS, a citizen of the United States, and a resident of Granite, county of Granite, State of Montana, have invented a new and useful Improvement in Hitching Devices, of which the following is a specification.

My invention is intended to supply an effective and practicable means of automatically checking horses, either from starting when standing, or when running away, and is an improvement on my invention for which Letters Patent, No. 495,961, were granted, April 25, 1893.

The improvement consists in providing a sleeve, working on a shaft carrying friction rollers, and controlled by a ratchet and pawl, a self-locking lever for placing the friction rollers in contact with the hubs of the wheels, and a spring roller for unwinding the check lines from the sleeve, when the friction rollers are released.

Figure I shows bottom plan of the device, attached to a vehicle. Fig. II shows the boss on the sleeve. Fig. III shows enlarged side elevation of mechanism from the lever to the rear. Fig. IV shows enlarged section of boss on sleeve with ratchet-wheel on shaft. Fig. V shows side elevation of whole mechanism. Fig. VI shows side elevation of supporting bar. Fig. VII shows plan of connecting rod.

Similar letters refer to similar parts in all the drawings.

Attached to the rear axle A, on which work the wheels B B, are the supporting bars C C, clamped to the axle A, by their clamped portions *a a*, and having the slotted bearings *b b* and the holes or bearings *c c*, and the offsets *c' c'* in which are the set screws *c'' c''*. The shaft D works in the slots *b* of the supporting bars C and carries at each end a friction roller E, in line with the hub R of the wheels B.

Fixed on the shaft D are the ratchet-wheels *e*. Working on the shaft D, between the supporting bars C C, is the sleeve G, having at each end the boss F fitting over the ratchet-wheel *e*, and carrying the spring pawl *f*, to engage said ratchet-wheel *e*. The inner rim of the boss F is notched and sloped as shown in Fig. II, and has the button *g*, to which the check lines H are attached. The shaft I works in the bearings *c c* of the supporting bars C C. Near its outer end there is firmly fixed to it the lever arm J and the arm K at about a right angle to the arm J. The connecting rod L, composed of two sections, joined by the opposite-threaded bolt *l*, connects the arm K with the shaft D. The bolt *l* has the squared center *m* and the two nuts *n n*. The lever arm J is connected by the rod *j*, with the hand lever M, fixed to the wagon box N.

Near the front of the wagon box N, on its under side, is the roller O, working in the bearings *o o*, and controlled by the coil spring P. The check lines H H have segments *h h* attached to the roller O.

Fixed to the axle A by the clamps *a* are the scrapers S, lying close to the hub R.

Having thus described my invention, its mode of operation is as follows: The segments *h h* of the check lines H H are wound around the spring roller O, so as to bring said lines taut between said roller O and the shaft D. The check lines are fastened to the bit of the animal drawing the vehicle. To keep the horse from starting, the hand lever M is pushed forward, pressing the friction rollers E E against the wheel hubs R R, by means of the lever arms J and K and connecting rod L. The lever arm K is raised until it passes the dead point, or the line to the center of the shaft D, and is there stopped by the set screw *c''*, and is self-locked. By means of this set screw *c''* and the bolt *l* in the connecting rod L, the pressure on the friction rollers E E can be nicely adjusted, at the same time insuring the self-locking feature. If the horse should now attempt to go forward, the pawl *f* catches in the ratchet-wheel *e*, and the sleeve G is rotated, winding up the check lines H H. The end of the check lines H H being attached to the button *g* on the boss F, the first revolution will take up much more of the lines H H than the subsequent ones. At the same time that the lines H H are wound up on the sleeve G, the segments are unwound from the roller O, and the coil spring P is tightened. If the horse, checked in his forward movement, should back, the shaft D will revolve in the opposite way; the sleeve G allowed to follow this motion, will be turned by the action of the coil spring P, winding up the segments $h\,h$ on the roller O, and unwinding the check lines H H, in so much, from the sleeve G. If the horse continues to back after the spring P has wound up the segments $h\,h$, the pawl $f$ will slip over the ratchet-wheel $e$, and have no effect on the sleeve G and the lines H H. The automatic action is, therefore, perfect, in checking, on forward movement, and releasing, on backward movement. The friction rollers are readily released from the wheel hub by the backward motion of the hand lever, M. In case of a runaway the rollers can be pressed against the hubs gradually, thus avoiding a sudden jerk.

Having thus described my invention, what I claim as new, and desire to secure by Letters Patent, is—

1. In a hitching device attached to a vehicle, the combination of the wheels, the shaft carrying friction rollers, the sleeve upon said shaft, connected therewith by a ratchet-wheel and pawl, means for putting said roller in contact with the hubs of said wheels, and check lines attached to said sleeve, with a spring-controlled roller, fastened to the bed of the vehicle and connected with said check lines, by separate segments or lines, substantially as shown and described.

2. In a hitching device attached to a vehicle, the combination of the wheels, the shaft carrying friction rollers, and the check lines attached to said shaft, with means for placing the rollers in contact with the hubs of said wheels, consisting of a bell-crank and a rod adjustable lengthwise connecting said crank and shaft, and forming a straight line with the connected arm of the bell crank, when the rollers are pressed against the hubs, so that, when, pressed just beyond this dead point, the arm of the bell crank comes in contact with the stop-pin $c''$ it becomes self-locked substantially as shown and described.

In testimony that I claim the foregoing as my invention I have signed my name, in presence of two witnesses, this 10th day of May, 1893.

CHARLES W. COLLINS.

Witnesses:
EDWARD C. RUSSEL,
R. L. WOOD.